United States Patent
Muthiah

(10) Patent No.: US 11,372,559 B1
(45) Date of Patent: Jun. 28, 2022

(54) DATA STORAGE DEVICE AND METHOD FOR ENABLING A COMPARE COMMAND WITH BUILT-IN DATA TRANSFORMATIONS

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/179,930

(22) Filed: Feb. 19, 2021

(51) Int. Cl.
*G06F 3/06* (2006.01)
*G06F 12/02* (2006.01)

(52) U.S. Cl.
CPC .......... *G06F 3/0629* (2013.01); *G06F 3/064* (2013.01); *G06F 3/0604* (2013.01); *G06F 3/0679* (2013.01); *G06F 12/0246* (2013.01)

(58) Field of Classification Search
None
See application file for complete search history.

(56) References Cited

U.S. PATENT DOCUMENTS

2005/0071567 A1 3/2005 Spix et al.
2016/0085443 A1 3/2016 Tomishima et al.

OTHER PUBLICATIONS

"Ubuntu Manpage: nvme-compare—Send an NVMe Compare command, provide results"; Compare command instructions; Ubuntu manuals; downloaded from the Internet at manpages.ubuntu.com/manpages/cosmic/man1/nvme-compare.1.html on Nov. 27, 2020; Canonical Ltd., 2019; 5 pages.

*Primary Examiner* — Kevin Verbrugge
(74) *Attorney, Agent, or Firm* — Crowell & Moring LLP

(57) ABSTRACT

A data storage device and method for enabling a compare command with built-in data transformations. In one embodiment, a data storage device is provided comprising a memory and a controller. The controller is configured to: receive, from a host, a compare command, a logical block address, data, and an instruction to perform a data transformation operation; read data from a location in the memory corresponding to the logical block address; execute the data transformation operation on the data read from the location in the memory; and compare a result of the data transformation operation with the data received from the host. Other embodiments are provided.

20 Claims, 7 Drawing Sheets

DATA STORAGE DEVICE AND METHOD FOR ENABLING A COMPARE COMMAND WITH BUILT-IN DATA TRANSFORMATIONS

BACKGROUND

A data storage device can be used to store data from a host. The Non-Volatile Memory Express (NVMe) specification defines a compare command that can be sent from the host to the data storage device. In response to receiving the compare command, the data storage device reads data from a location in its memory corresponding to a logical block address specified in the command and compares the read data to a comparison data buffer transferred as part of the command. If the data read from the memory and the comparison data buffer are equivalent, the command completes successfully. Otherwise, the command completes with a compare failure error. If metadata is provided in the command, a comparison can also be performed for the metadata, excluding protection information.

DETAILED DESCRIPTION

Overview

Figure 1A:
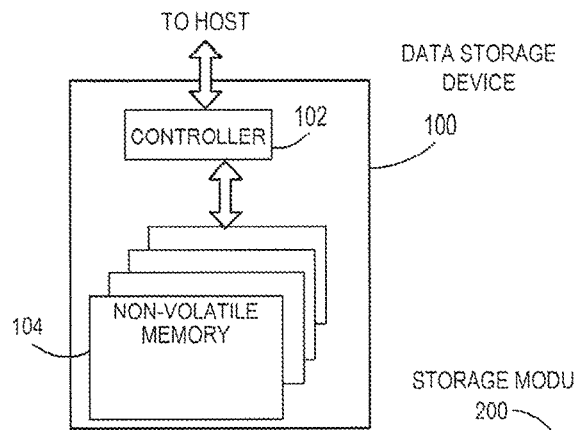
FIG. 1A is a block diagram of a data storage device of an embodiment.

By way of introduction, the below embodiments relate to a data storage device and method for enabling a compare command with built-in data transformations. In one embodiment, a data storage device is provided comprising a memory and a controller. The controller is configured to: receive, from a host, a compare command, a logical block address, data, and an instruction to perform a data transformation operation; read data from a location in the memory corresponding to the logical block address; execute the data transformation operation on the data read from the location in the memory; and compare a result of the data transformation operation with the data received from the host.

In some embodiments, the controller is further configured to inform the host of a match in response to an exact match between the result and the data received from the host.

In some embodiments, the controller is further configured to inform the host of a match in response to the result matching the data received from the host by a predetermined threshold.

In some embodiments, the command comprises metadata comprising configuration information for the data transformation operation.

In some embodiments, the controller is further configured to process the configuration information prior to executing the data transformation operation.

In some embodiments, the compare command comprises a vendor-specific command.

In some embodiments, the data transformation operation comprises an operation that transforms data between time and frequency domains.

In some embodiments, the data transformation operation comprises an operation that transforms data between a fixed point and a floating point format.

In some embodiments, the data transformation operation comprises a data approximation operation.

In some embodiments, the data storage device is configured to be embedded in the host.

In some embodiments, the memory comprises a three-dimensional memory.

In another embodiment, a method is provided that is performed in a host in communication with a data storage device comprising a memory. The method comprises: sending, to the data storage device, a compare command, a logical block address, data, and an instruction to perform a data transformation operation; and receiving, from the data storage device, an outcome of a comparison between the data and a result of the data transformation operation performed on data stored in a location in the memory of the data storage device corresponding to the logical block address.

In some embodiments, the command comprises metadata comprising configuration information for the data transformation operation.

In some embodiments, the compare command comprises a vendor-specific command.

In some embodiments, the data transformation operation comprises a pattern recognition operation.

In some embodiments, the data transformation operation comprises an operation that transforms data between time and frequency domains.

In some embodiments, the data transformation operation comprises an operation that transforms data between a fixed point and a floating point format.

In some embodiments, the data transformation operation comprises a data approximation operation.

In some embodiments, the data storage device is embedded in the host.

In another embodiment, a data storage device is provided comprising: a memory; means for receiving, from a host, a compare command, a logical block address, data, and an instruction to perform a data transformation operation; means for reading data from a location in the memory corresponding to the logical block address; means for executing the data transformation operation on the data read from the location in the memory; and means for comparing a result of the data transformation operation with the data received from the host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
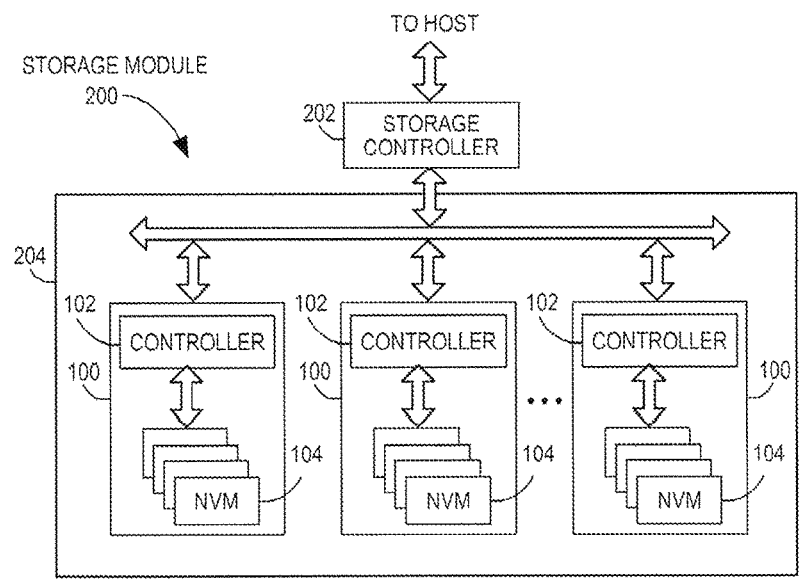
FIG. 1B is a block diagram illustrating a storage module of an embodiment.
Figure 1C:
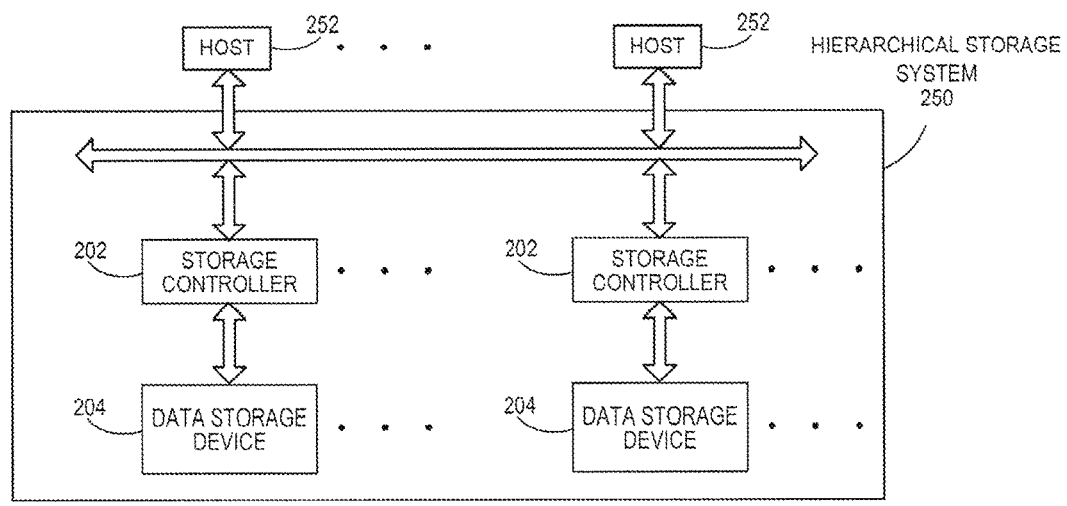
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
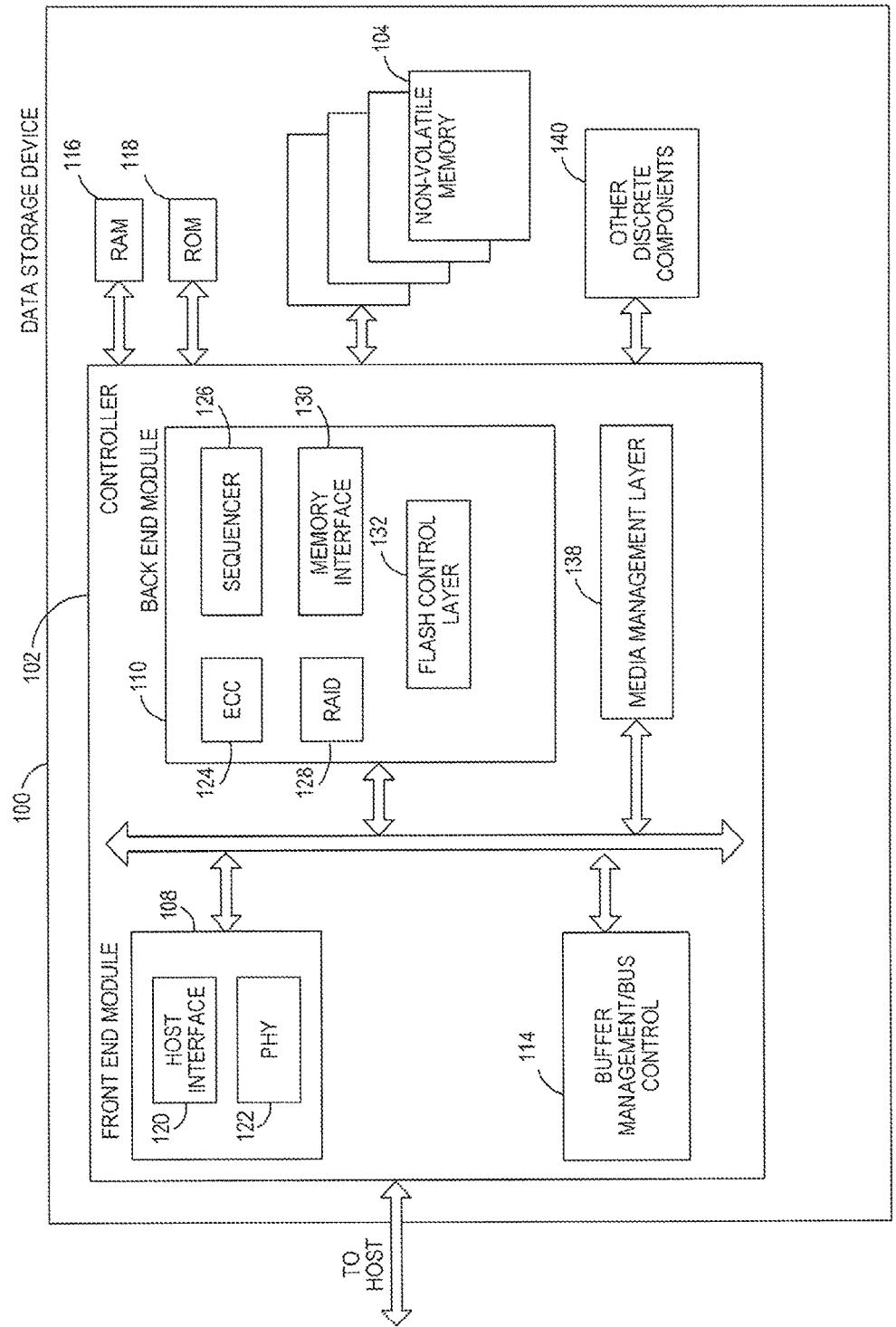
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
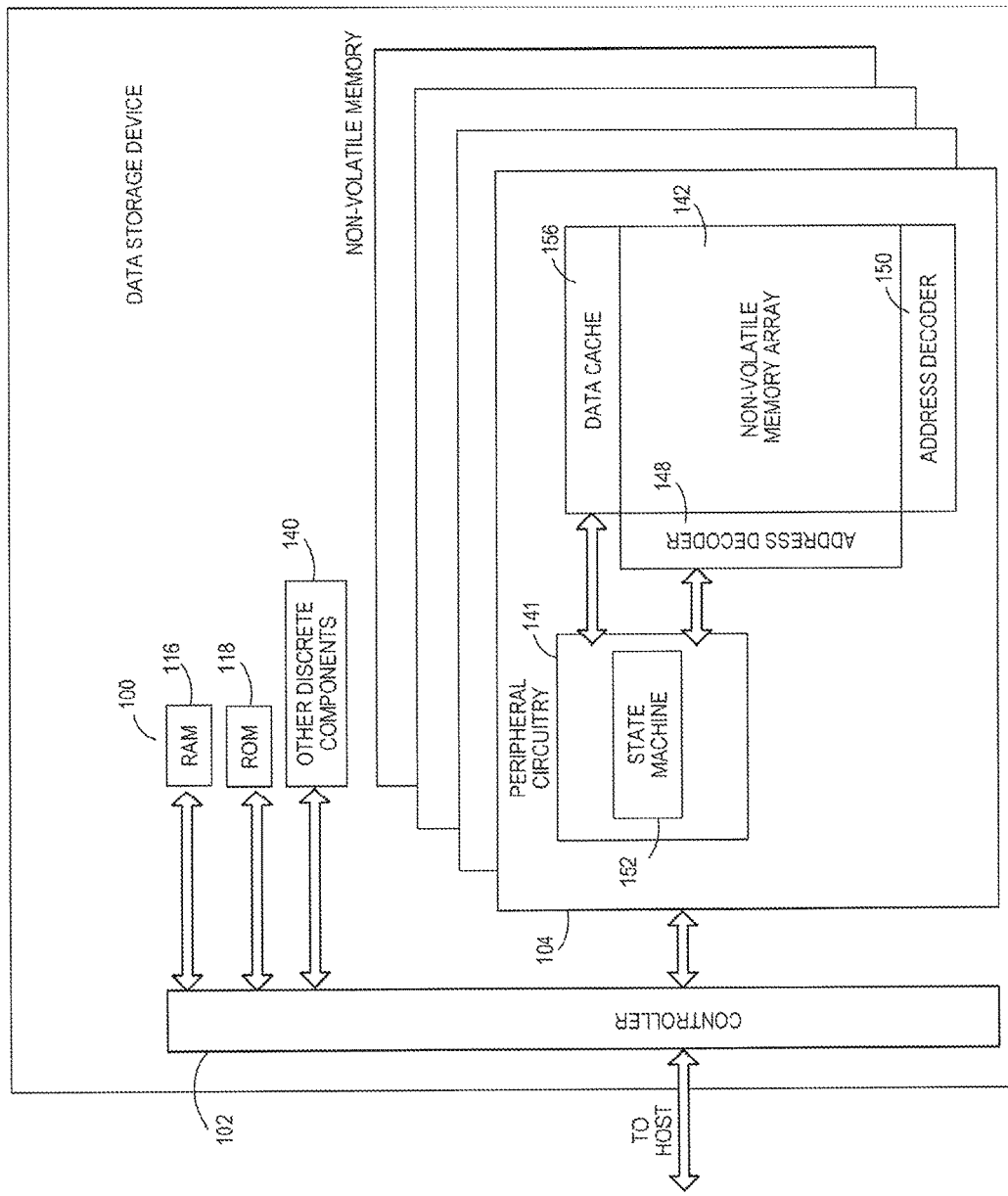
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
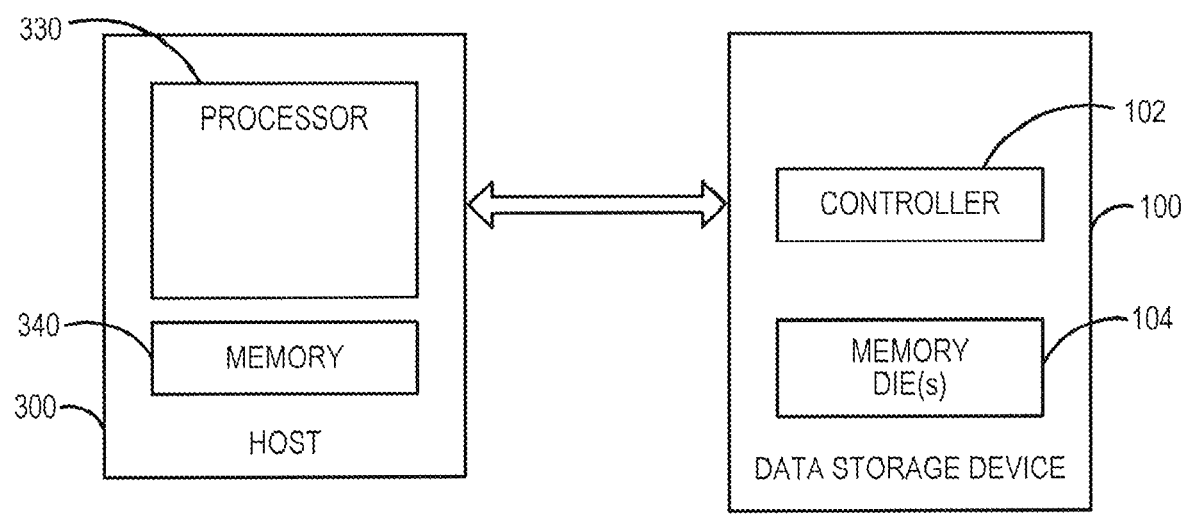
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Figure 4:
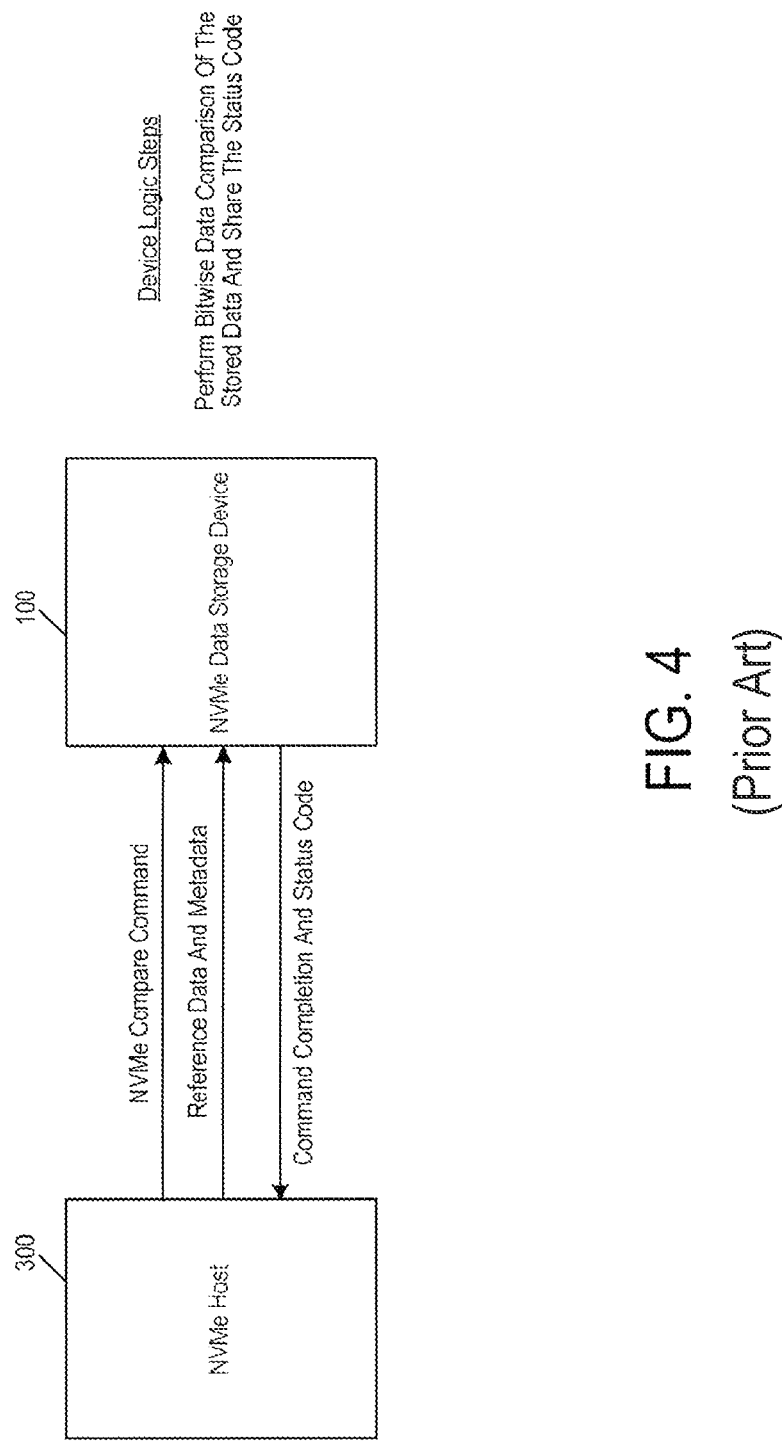
FIG. 4 is a block diagram of a host and data storage device of an embodiment illustrating a compare operation.

As mentioned above, a data storage device can be used to store data from a host. The Non-Volatile Memory Express (NVMe) specification defines a compare command that can be sent from the host to the data storage device. In response to receiving the compare command, the data storage device reads data from a location in its memory corresponding to a logical block address specified in the command and compares the read data to a comparison data buffer transferred as part of the command. If the data read from the memory and the comparison data buffer are equivalent, the command completes successfully. Otherwise, the command completes with a compare failure error. If metadata is provided in the command, a comparison can also be performed for the metadata, excluding protection information. This operation is illustrated in FIG. 4.

This compare command to perform plain bit-wise comparison of data has limited use cases. For example, in modern image, speech, and pattern recognition operations, matching and comparing of processed data to sample data are often required. The following embodiments address this need by presenting a new type of compare command that performs a comparison after a data transformation operation, which can lead to system optimization in compute segments. It should be noted that while NVMe is being used herein to illustrate example implementations, the use of NVMe is not required. Further, none of the claims should be read as requiring NVMe unless explicitly recited therein.

Figure 5:
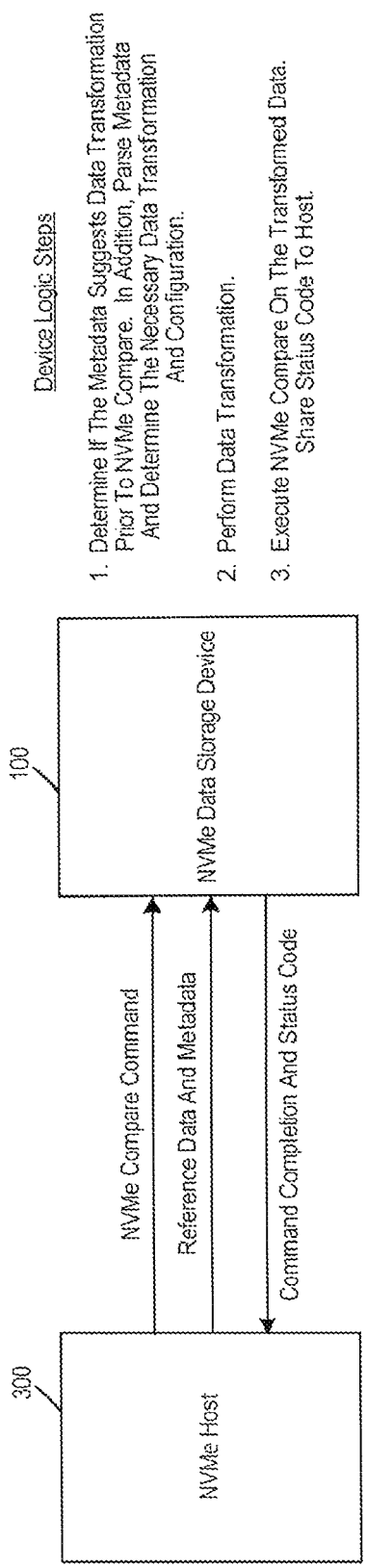
FIG. 5 is a block diagram of a host and data storage device of an embodiment illustrating a compare operation involving data transformation.

In general, in one embodiment, the controller 102 in the data storage device 100 receives, from the host 300, a compare command, a logical block address, data, and an instruction to perform a data transformation operation. The compare command can be a vendor-specific command, and the various elements of the command can be received together or separately over time. Also, in one implementation, configuration information for the data transformation operation can be provided in metadata. In response to receiving this command, the controller 102 reads data from a location in the memory 104 corresponding to the logical block address and executes the data transformation operation on that data. Then, the controller 102 determines whether a result of the data transformation operation matches the data received from the host 300. The appropriate match or mismatch code can then be sent to the host 300. FIG. 5 illustrates these operations.

The data storage device 100 can perform multiple data transformations according to a predetermined agreement. Also, the data transformation operation(s) can take any suitable form, such as, but not limited to, time-to-frequency domain (or vice versa) transformation, fixed-point-to-floating-point (or vice versa) transformation, and/or transformation for simple data approximations. Other types of operations can be used.

Figure 6:
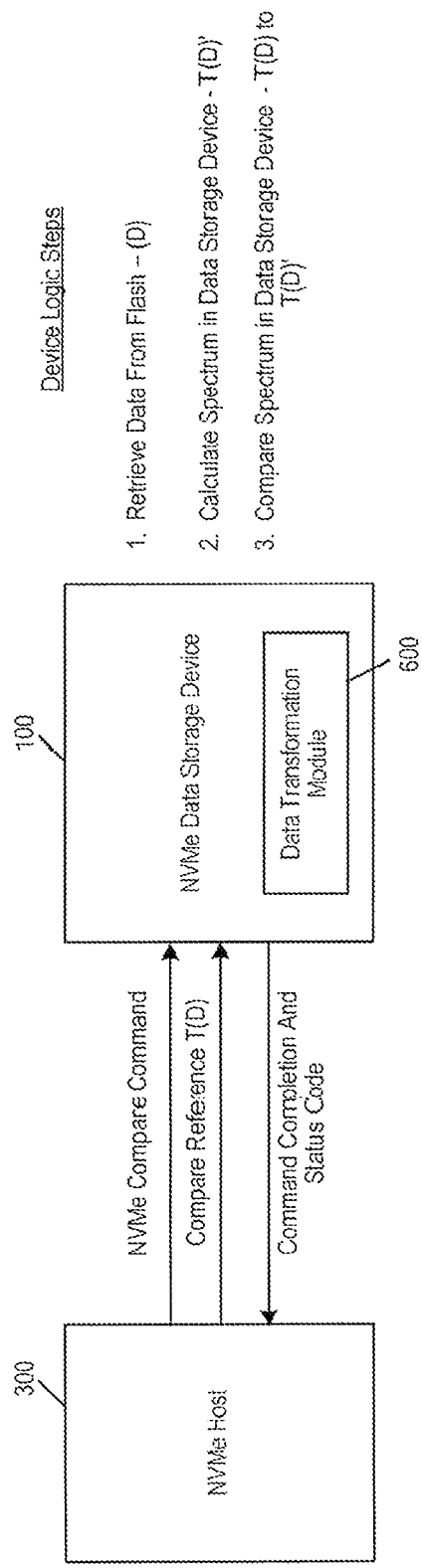
FIG. 6 is a block diagram of a host and data storage device of an embodiment illustrating a compare operation involving spectral transformation.

In one example implementation, the host 300 is configured for artificial intelligence/machine learning and uses the compare feature of these embodiments to verify if a spectrum in hand is equal to that of a spectrum of the logical data stored in the data storage device 100. In operation, the host 300 can tag the metadata with spectral enumeration, and the data storage device 100 can perform spectral transformation of the stored data and respond if the spectrum matches for the stored logical data for a given fast Fourier transform (FFT) configuration. This is illustrated in FIG. 6. The host 300 can be running the compare logic in a loop to determine a match of power spectral density of the stored data. Using these embodiments can vastly reduce data transfer and utilize storage compute, thereby optimizing edge-computing systems.

In another example, a media host 300 stores fixed-point samples in the data storage device 100. Another host working with floating point configuration intends to perform value-wise comparison of fixed-point data available in the data storage device 100. The client host tags the metadata with floating-point enumeration, and the data storage device 100 responds if the data matches with the stored logical data. To accomplish this, the data storage device 100 can perform a fixed-to-floating-point conversion of the stored data according to the configuration instruction in metadata prior to the compare command.

In another example, the data storage device 100 can perform bit-wise approximation of the stored data prior to applying the compare command. In addition, the method can be used to compare only a few most-significant bits of data rather than the entire data set, which may be a practical requirement in fixed-point comparisons.

As another example, these embodiments can be used in magnitude and phase comparisons use cases. Further, in some other use cases, the data storage device 100 may respond with a match if the threshold match of the device-transformed data is more than a predetermined threshold, as opposed to an exact match. Various algorithms involving detection and pattern matching can benefit from this. Likewise, multiple data transformation techniques can be applied in the data storage device 100 prior to applying a typical compare command on the data.

There are several advantages associated with these embodiments. For example, these embodiments can widen the scope of data storage device usage to benefit the compute-class storage segment. Also, because these embodiments vastly reduce data transfer by utilizing storage compute power, these embodiments can be used to optimize edge-computing systems. Further, because these embodiments do not require a hardware change (e.g., a change to the kernel), adoption of this command (e.g., in the NVMe specification) should be relatively straightforward. Also, these embodiments have applicability to Internet of Things (IoT) devices, which may have the data storage device 100 embedded in it.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    a controller configured to:
        receive, from a host, a compare command, a logical block address, data, and an instruction to perform a data transformation operation;
        read data from a location in the memory corresponding to the logical block address;
        execute the data transformation operation on the data read from the location in the memory; and
        compare a result of the data transformation operation with the data received from the host.

2. The data storage device of claim 1, wherein the controller is further configured to inform the host of a match in response to an exact match between the result and the data received from the host.

3. The data storage device of claim 1, wherein the controller is further configured to inform the host of a match in response to the result matching the data received from the host within a predetermined threshold.

4. The data storage device of claim 1, wherein the compare command comprises metadata comprising configuration information for the data transformation operation.

5. The data storage device of claim 4, wherein the controller is further configured to process the configuration information prior to executing the data transformation operation.

6. The data storage device of claim 1, wherein the compare command comprises a vendor-specific command.

7. The data storage device of claim 1, wherein the data transformation operation comprises an operation that transforms data between time and frequency domains.

8. The data storage device of claim 1, wherein the data transformation operation comprises an operation that transforms data between a fixed point and a floating point format.

9. The data storage device of claim 1, wherein the data transformation operation comprises a data approximation operation.

10. The data storage device of claim 1, wherein the data storage device is configured to be embedded in the host.

11. The data storage device of claim 1, wherein the memory comprises a three-dimensional memory.

12. A method comprising:
    performing the following in a host in communication with a data storage device comprising a memory:

sending, to the data storage device, a compare command, a logical block address, data, and an instruction to perform a data transformation operation; and receiving, from the data storage device, an outcome of a comparison between the data and a result of the data transformation operation performed on data stored in a location in the memory of the data storage device corresponding to the logical block address.

13. The method of claim 12, wherein the compare command comprises metadata comprising configuration information for the data transformation operation.

14. The method of claim 12, wherein the compare command comprises a vendor-specific command.

15. The method of claim 12, wherein the data transformation operation comprises a pattern recognition operation.

16. The method of claim 12, wherein the data transformation operation comprises an operation that transforms data between time and frequency domains.

17. The method of claim 12, wherein the data transformation operation comprises an operation that transforms data between a fixed point and a floating point format.

18. The method of claim 12, wherein the data transformation operation comprises a data approximation operation.

19. The method of claim 12, wherein the data storage device is embedded in the host.

20. A data storage device comprising:

a memory;

means for receiving, from a host, a compare command, a logical block address, data, and an instruction to perform a data transformation operation;

means for reading data from a location in the memory corresponding to the logical block address;

means for executing the data transformation operation on the data read from the location in the memory; and means for comparing a result of the data transformation operation with the data received from the host.

* * * * *